Feb. 28, 1961

T. C. GERNER 2,973,208

SELF-ADJUSTING THREADED BUSHING WITH LOCKING BAR

Filed Dec. 23, 1958

Theodore C. Gerner
INVENTOR.

BY Clarence A. O'Brien
and Harvey B. Jacobson
Attorneys

Feb. 28, 1961 T. C. GERNER 2,973,208
SELF-ADJUSTING THREADED BUSHING WITH LOCKING BAR
Filed Dec. 23, 1958 2 Sheets-Sheet 2

Theodore C. Gerner
INVENTOR.

BY *Clarence A. O'Brien*
*and Harvey B. Jacobson*
Attorneys

United States Patent Office 2,973,208
Patented Feb. 28, 1961

2,973,208

SELF-ADJUSTING THREADED BUSHING WITH LOCKING BAR

Theodore C. Gerner, P.O. Box 4305, Oklahoma City, Okla.

Filed Dec. 23, 1958, Ser. No. 782,580

7 Claims. (Cl. 280—95)

This invention comprises a novel and useful self-adjusting threaded bushing with locking bar, and more specifically relates to a wear take-up replacement assembly for use with the third arm of steering linkages of automotive vehicles.

The invention disclosed and claimed herein relates to similar subject matter set forth and claimed in my co-pending application Serial No. 779,997 for Self-Adjusting Threaded Bushing With Locking Pin, filed December 12, 1959 and constitutes a modified construction of automatic slack take-up for the threaded journals of idler arms.

In many of the types of present-day automotive vehicles the steerage linkage by which the steering wheel is connected to the vehicle front wheels for steering the same includes what is known as a steering idler arm or third arm, the same comprising a member having one extremity journalled in a support carried by the vehicle frame and to which other elements of the steerage linkage are connected. During normal operation of the steering mechanism, this idler arm possesses a horizontal oscillating or swinging movement about a vertical axis. Since this swinging movement is accompanied by the imposition of vibrations transmitted from the vehicle wheels during the operation of the same and up through the connecting linkage to the idler arm, it is obvious that its threaded journalled connection is subject to considerable wear and stresses, which eventually cause lost motion or play to such an extent as to render the steering mechanism of the vehicle unsafe. Heretofore, it has been necessary to replace the idler arm and the bushing into which the same is threadedly engaged in order to eliminate the excessive play therein. This repair is somewhat expensive, and moreover produces a swivelled joint which soon becomes defective for the same reason as the original construction.

It is therefore the primary purpose of this invention to provide a replacement assembly which will restore the worn bearing between the idler arm and its support and return the idler arms to its original condition of accuracy and precision of fit in its journal.

A more general object of the invention is to provide a replacement assembly which shall be readily applicable to recondition and restore worn screw-threadedly engaged journals of this general type to their original condition of fit.

A further object of the invention is to provide a wear take-up bushing for screw-threadedly engaged members which will provide a substitute bearing surface therefor of considerably greater extent and therefore having a more effective and longer useful service than the original bearing provided therefor.

A further object of the invention is to provide a wear take-up bearing assembly in accordance with the preceding objects which shall possess means for automatically taking up slack as the same develops through wear in the replacement assembly.

A still further object of the invention is to provide a wear take-up assembly for the steering mechanism of automotive vehicles which may be quickly and easily installed, does not require the alteration or addition of elements to the conventional steering mechanism other than the sole change of replacing the worn idler arm bushing with the replacement assembly of this invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
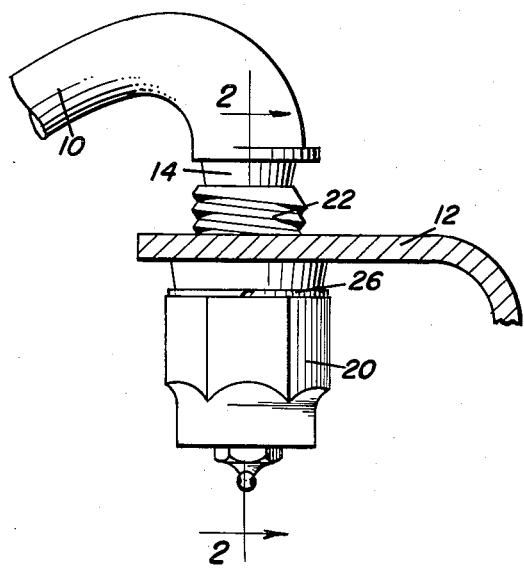
Figure 1 is a fragmentary view in elevation showing the manner in which a conventional idler arm, part being broken away, and forming a part of a conventional steering linkage of an automotive vehicle is journalled upon the idler arm support bracket, shown in section, in accordance with the replacement assembly of this invention.
Figure 2:
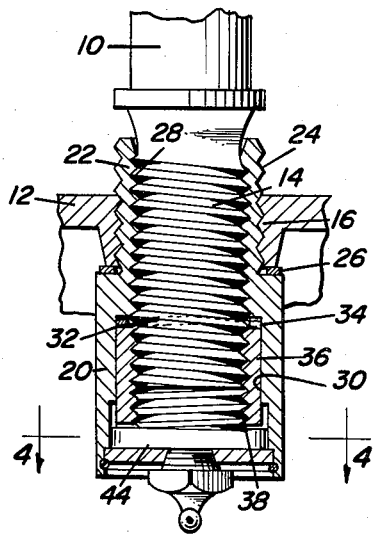
Figure 2 is a view in vertical transverse section taken substantially upon the plane indicated by the section line 2—2 of Figure 1 and showing the internal structural details of the replacement assembly of this invention.
Figure 3:
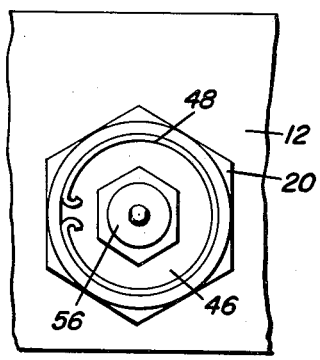
Figure 3 is a bottom plan view of the device of Figures 1 and 2.
Figure 4:
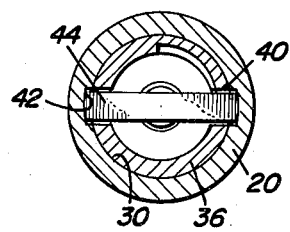
Figure 4 is a horizontal sectional detail view taken substantially upon the plane indicated by the section line 4—4 of Figure 2 and showing in particular the means by which the pressure adjusting sleeve of this invention is restrained against rotation but is permitted axial movement.
Figure 5:
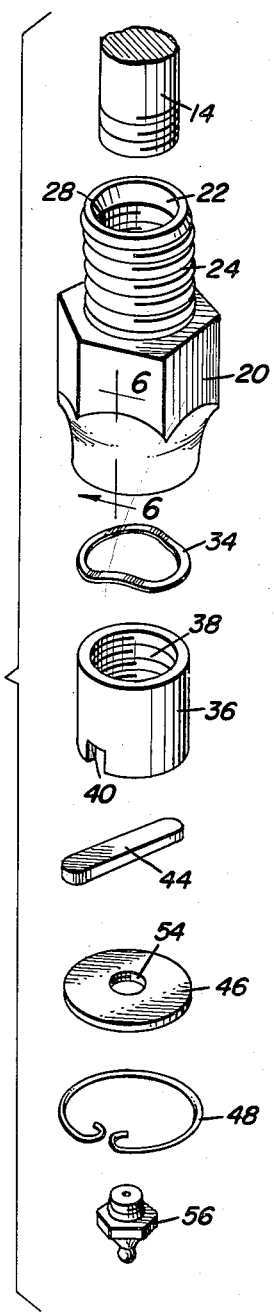
Figure 5 is an exploded perspective view of the various elements making up the replacement assembly, together with the end of the idler arm which is associated therewith.

Referring first to Figure 1 a conventional idler arm indicated generally by the numeral 10 is shown journalled in a conventional support bracket 12 carried by a suitable portion of the framework of a motor vehicle. The idler arm 10 forms a part of the conventional steering linkage of the vehicle, and includes an externally threaded stem or shank 14 by which the idler arm is rotatably journalled in the bracket 12 by means of a conventional bushing, not shown, which is threaded into the internally threaded bore 16 of the bracket and is in turn internally threaded to receive therein the threaded shank 14 of the idler arm. With this construction, it is obvious that once the idler arm has its shank 14 threaded into the conventional bushing, the idler arm is then mounted for horizontal swinging movement about the vertical axis through the shank 14, and that any strains or vibrations imparted to the idler arm will in turn be transmitted through the cooperating screw threads between the shank of the same and the bushing to the latter thereby resulting in wear upon the threads. Eventually this wear produces lost motion which causes the idler arm to rattle or move in its journal thereby seriously effecting the required geometry of the steering linkage.

When this condition arises, the necessary repairs to the steering linkage are usually performed by replacing both the idler arm 10 and the conventional bushing in order to obtain a renewed precision fit between the shank of the idler arm and its bushing in which it is journalled. However, since there is no way to take up any slack developing in this journal, it is evident that the continued wear and strains imposed upon the idler arm in time causes the same defects previously referred to.

The present invention provides a replacement unit by means of which the usual conventional bushing, not shown, is replaced in its entirety by a replacement assembly which cooperates with the worn shank 14 of the idler arm in such a way as to restore the desired precision fit of the latter in its journal. Further, the replacement unit provides means which will automatically take up any wear developing in the renewed journal provided by this replacement assembly thereby greatly prolonging the life and useful service of the same.

For this purpose, the replacement assembly consists of a cylindrical body 20 having a diametrically reduced neck portion 22. The latter is externally threaded as at 24 for reception in the threaded bore 16 of the bracket 12 whereby when the body 20 is inserted therein, the usual gasket or the like 26 being interposed between the body and the bracket, there will be provided a new bushing for the idler arm replacing the previous conventional bushing.

The reduced portion 22 also an internally threaded bore 28 extending inwardly from the end of the reduced portion, this bore being threaded to receive the worn threaded end 14 of the idler arm. In some instances, it will be preferred to form the bore 28 of a slightly oversized thread in order to cooperate with the worn threaded portion 14 and provide a close fit therewith.

At its lower end, the body 20 is provided with a diametrically enlarged bore or chamber 30 which joins the threaded bore 28 by means of the annular shoulder 32. A spring washer 34 is seated on this shoulder and is yieldingly engaged with the annular flat extremity of a pressure sleeve 36. The latter is open at both ends, being internally threaded as at 38 with the same pitch of thread as the bore 28 to thereby be threadedly engaged upon the lower extremity of the threaded shank 14 of the idler arm.

As so far described it will now be apparent that once the shank 14 of the idler arm has been threaded into the bore 28, the spring washer 34 will be placed therearound and against the shoulder 32, after which the sleeve 36 will be placed in the bore 30 and threaded upon the extremity of the shank 14. The sleeve 36 will thus serve to apply any desired pressure upon the resilient washer 34 thereby initially compressing the same. This pressure besides compressing the washer will also apply a downward thrust upon the shank 14, thereby tightening its threads in the bore 28, and obviating all lost motion or slack between the idler arm and its journalled engagement in the bushing.

Figure 6:
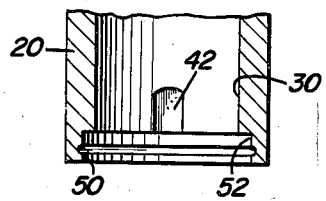
Figure 6 is a fragmentary view in vertical central section of the lower portion of the body of the replacement unit, being taken substantially upon the plane indicated by section line 6—6 of Figure 5.

It will be noted that the pressure sleeve 36 although being threaded upon the idler arm extremity 14 is freely slidable in the chamber 30 in the body 20. It is desired, however, to provide a means which will lock the sleeve against rotation in order to prevent any variation in the amount of force applied to the spring washer 34 and thus in the amount of spring pressure applied to the shank 14. For this purpose, the pressure sleeve at its lower end is provided with a pair of diametrically disposed slots 40, and a pair of similar diametrically disposed slots 42, see Figure 6, are provided in the wall of the chamber 30. A locking bar 44 is then placed in the diametrically aligned slots 40 and 42 thereby locking the sleeve 36 against rotation but permitting axial movement of the same as necessitated by expansion or contraction of the spring washer 34. A closure disk 46 is then disposed in the outer end of the bore or chamber 30, preventing withdrawal of the locking bar 44 from disengagement in the locking notches. A split ring 48 is then engaged in the retained circumferentially extending groove 50 formed in a diametrically enlarged counterbore 52 at the bottom end of the chamber 30 to releasably retain the closure plate 46 in place. The latter may have an internally threaded bore as at 54 for the reception of a conventional lubricating fitting 56.

Figure 7:
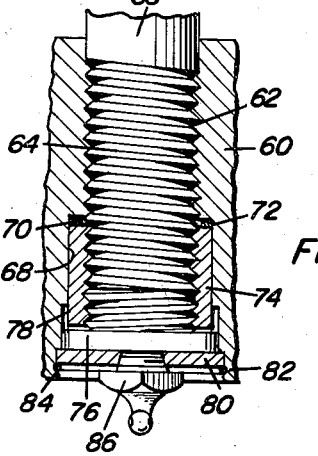
Figure 7 is a view similar to Figure 2 but showing the principles of this invention as embodied in Figures 1–6 applied to general use in the take-up of wear in a threaded journal.

Reference is now made to Figure 7 which illustrates the principles of this invention applied to a more general application. In this form, instead of the replacement bushing body 20 there is provided a body 60 of any desired character having an internally threaded bore 62 for receiving the threaded extremity 64 of a bolt, shaft or other similar member 66.

The body 60 is a replacement of the original conventional member receiving the threaded portion 64 of the member 66 for journalled movement therein, and corresponds in function to the member 20 previously described. The body 60 is provided with a bore 68 at one end thereof, which is diametrically enlarged relative to the bore 62 and which has a smooth cylindrical interior surface. This bore merges into the bore 62 by means of an annular shoulder 70 and a spring washer 72 is placed upon the shoulder corresponding to the spring washer 34 previously described. A pressure sleeve 74 corresponding in turn to the pressure sleeve 36 is then employed, being threaded upon the extremity 64 and compressing the spring 72 to thereby apply tension between the member 60 and 66 thus taking up any wear or slack between the engaging threads of the portions 64 and 62. As in the preceding embodiment, this pressure sleeve is retained against relative rotation by a locking bar 76 corresponding to the bar 44 and which cooperates with registering notches in the sleeve 74 and with the axially extending slots or keyways 78 formed in the wall of the chamber 68. Further, this bar is retained in place as by a disk 80, resilient split ring 82 and cooperating annular groove 84 and is provided with a lubricating fitting 86 corresponding to previously mentioned elements of the preceding embodiment. The function of this form of the device is identical with that previously described.

Figure 8:
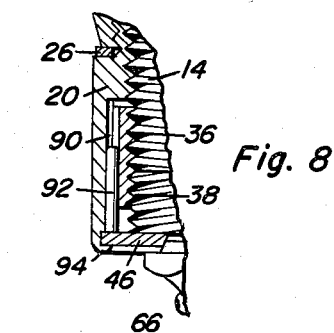
Figure 8 is a fragmentary view in section showing a modified construction in which a pin replaces the bar of the embodiment of Figures 1–5 as a locking means for the pressure sleeve of the invention.

In some instances it may be found desirable to employ some other locking means which will prevent rotation of the pressure sleeve but will permit axial movement of the same. For this purpose a construction such as that shown in Figure 8 may be employed. It is to be understood that this modified construction of locking means may be provided and employed with either of the two previously mentioned embodiments but for simplicity of illustration the same has been considered as applied to the corresponding members of the embodiments of Figures 1–6 and thus is provided with the same reference numerals. In this form, instead of providing diametrically extending notches in the pressure sleeve 36 and in the internal wall of the chamber of the body 20, there is instead provided an axially extending bore as shown at 90 and which is formed in both of the adjacent surfaces of the pressure sleeve 36 and the wall of the chamber of the body 20. Received in this bore formed by the two complementary grooves of these members is a locking pin 92 which has been inserted from the open end of the registering bore sections. This pin is retained in place as by a pressure plate 46. Although the pressure plate may be retained by the previously described split ring 48, it is preferred in some instances to employ as a retaining means an integral flange 94 which is turned over from the extremity of the body 20 and thus will permanently lock the retaining plate 46 in place.

It will be understood that this retaining flange construction may also be employed with the embodiment of Figure 7.

In all of these forms of the invention, it will be observed that there has been provided a replacement assembly in which the original female member receiving the threaded end of a male member has been replaced by a new female member of considerably greater length together with a movable pressure sleeve therein and that the new female member and pressure sleeve have aligned internally threaded bores which grip the male member throughout the entire length of the same thus providing a much greater length of bearing area, and in addition provide a tensioning force upon the male member which tightens the engagement of its threads with those of the female member and of the pressure sleeve.

The arrangement is such that resilient pressure is applied to the pressure sleeve so that in the event that wear develops, the pressure sleeve will be urged downwardly thereby retaining the tension upon the threaded extremity of the male member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A replacement assembly for idler arm bearings of an automobile steering linkage, said linkage having a mounting bracket, a bushing therein and an idler arm with a threaded extremity screw threadedly engaged in said bushing; a replacement bushing having an externally threaded portion threadedly engaged in said bracket and having an internally threaded bore in one end receiving the screw threaded extremity of an idler arm, said replacement bushing having a diametrically enlarged bore defined by a radially extending shoulder communicating with said threaded bore, an internally threaded pressure sleeve removably received and axially slidable in said enlarged bore and threaded upon said extremity and applying thrust to the threaded engagement of the latter with said threaded bore, means preventing rotation of said pressure sleeve relative to said replacement bushing, and resilient means disposed between said shoulder and said pressure sleeve yieldably urging said pressure sleeve away from said shoulder.

2. The combination of claim 1 wherein said enlarged bore opens to the other end of said body, a closure plate for said enlarged bore engaging and preventing release of said rotation preventing means.

3. The combination of claim 1 wherein said enlarged bore opens to the other end of said body, a closure plate for said enlarged bore engaging and preventing release of said rotation preventing means, means releasably retaining said closure plate comprising a split ring, said enlarged bore having a circumferential groove releasably receiving said ring.

4. The combination of claim 1 wherein said rotation preventing means comprises diametrically registering, longitudinally extending notches in said pressure sleeve and wall of said enlarged bore, a lock member axially inserted in said registering slots.

5. The combination of claim 4 wherein said lock member comprises a diametrically extending bar.

6. The combination of claim 1 wherein said rotation preventing means comprises diametrically registering, longitudinally extending notches in said pressure sleeve and wall of said enlarged bore, a lock member axially inserted in said registering slots, said lock member comprising an axially extending pin.

7. The combination of claim 1 wherein said rotation preventing means comprises diametrically registering, longitudinally extending notches in said pressure sleeve and wall of said enlarged bore, a lock member axially inserted in said registering slots, said lock member comprising an axially extending pin, said registering notches comprising axially extending, complementary grooves in the adjacent surfaces of said pressure sleeve and said wall.

References Cited in the file of this patent

UNITED STATES PATENTS

| | | |
|---|---|---|
| 2,324,731 | Simmonds | July 20, 1943 |
| 2,464,982 | Leighton | Mar. 22, 1949 |
| 2,689,756 | Carlson | Sept. 21, 1954 |
| 2,751,563 | Willyard et al. | June 19, 1956 |
| 2,844,382 | Dick | July 22, 1958 |